United States Patent
Schnitzer

(10) Patent No.: US 9,010,807 B2
(45) Date of Patent: Apr. 21, 2015

(54) STEERING SHAFT BEARING UNIT FOR ROTATABLY MOUNTING A STEERING SHAFT

(75) Inventor: Rony Schnitzer, Ruggell (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/352,494

(22) PCT Filed: Sep. 5, 2012

(86) PCT No.: PCT/EP2012/003718
§ 371 (c)(1),
(2), (4) Date: Apr. 17, 2014

(87) PCT Pub. No.: WO2013/056764
PCT Pub. Date: Apr. 25, 2013

(65) Prior Publication Data
US 2014/0284910 A1    Sep. 25, 2014

(30) Foreign Application Priority Data
Oct. 19, 2011   (DE) .......................... 10 2011 054 606

(51) Int. Cl.
*F16C 17/02* (2006.01)
*B62D 1/19* (2006.01)
*B62D 21/05* (2006.01)
(Continued)

(52) U.S. Cl.
CPC .............. *F16C 17/022* (2013.01); *B62D 1/195* (2013.01); *B62D 21/05* (2013.01); *B62D 1/184* (2013.01); *B62D 1/16* (2013.01)

(58) Field of Classification Search
USPC ....................................................... 280/779
IPC .. B62D 1/16, 1/184, 1/195, 21/05; F16C 17/022
See application file for complete search history.

(56) References Cited

U.S. PATENT DOCUMENTS

| 5,239,888 A | 8/1993 | Sevault et al. |
| 5,377,555 A | 1/1995 | Hancock |

(Continued)

FOREIGN PATENT DOCUMENTS

| DE | 696 02 206 | 11/1999 |
| DE | 603 00 128 | 4/2005 |

(Continued)

OTHER PUBLICATIONS

International Search Report (ISR) issued Nov. 30, 2012 in International (PCT) Application No. PCT/EP2012/003718.

*Primary Examiner* — Faye M Fleming
(74) *Attorney, Agent, or Firm* — Wenderoth, Lind & Ponack, LLP.

(57) ABSTRACT

A steering shaft bearing unit for rotatably mounting a steering shaft of a steering column for a motor vehicle includes at least one circumferentially closed region for accommodating at least one bearing for rotatably mounting the steering shaft, and at least one securing region for securing the steering shaft bearing unit to a console part of the steering column. At least one through-hole, in particular two through-holes, for guiding a clamping bolt of the steering column therethrough is/are arranged in the securing region. The steering shaft bearing unit is formed by joining, preferably welding, together at least two, preferably exactly two half-shells, each of which includes at least one section of the securing region and at least one section of the at least one circumferentially closed region.

17 Claims, 7 Drawing Sheets

(51) Int. Cl.
  *B62D 1/184* (2006.01)
  *B62D 1/16* (2006.01)

(56) References Cited

U.S. PATENT DOCUMENTS

| | | | |
|---|---|---|---|
| 5,730,465 | A | 3/1998 | Barton et al. |
| 5,927,152 | A | 7/1999 | Marzio et al. |
| 7,350,813 | B2 | 4/2008 | Inoue |
| 7,607,694 | B2 | 10/2009 | Shinohara et al. |
| 7,735,391 | B2 | 6/2010 | Osawa et al. |
| 7,861,615 | B2 | 1/2011 | Harris et al. |
| 7,918,483 | B2 | 4/2011 | Galehr et al. |
| 8,616,580 | B2 * | 12/2013 | Maniwa et al. ............... 280/779 |
| 2002/0084644 | A1 | 7/2002 | Rinker et al. |
| 2002/0178857 | A1 | 12/2002 | Matsumiya |
| 2005/0016315 | A1 | 1/2005 | Breuss et al. |
| 2006/0151984 | A1 | 7/2006 | Higashino et al. |
| 2007/0069513 | A1 | 3/2007 | Kirihara et al. |
| 2008/0178702 | A1 | 7/2008 | Lutz |
| 2008/0252056 | A1 | 10/2008 | Moriyama et al. |
| 2009/0044656 | A1 | 2/2009 | Okada et al. |
| 2010/0018340 | A1 | 1/2010 | Schnitzer et al. |
| 2010/0282016 | A1 | 11/2010 | Oehri et al. |
| 2010/0294072 | A1 | 11/2010 | Ishii et al. |
| 2011/0259140 | A1 | 10/2011 | Fevre |
| 2012/0297917 | A1 | 11/2012 | Mashimo et al. |

FOREIGN PATENT DOCUMENTS

| | | |
|---|---|---|
| DE | 11 2009 000 027 | 8/2010 |
| EP | 0 502 761 | 9/1992 |
| EP | 0 600 700 | 6/1994 |
| EP | 0 770 537 | 5/1997 |
| EP | 1 125 820 | 8/2001 |
| EP | 0 794 103 | 10/2002 |
| EP | 1 359 082 | 11/2003 |
| EP | 1 535 824 | 6/2005 |
| EP | 1 547 902 | 6/2005 |
| EP | 1 553 002 | 7/2005 |
| FR | 2 729 361 | 7/1996 |
| GB | 2 431 980 | 5/2007 |
| JP | 10-7003 | 1/1998 |
| JP | 2002-302046 | 10/2002 |
| JP | 2004-161276 | 6/2004 |
| JP | 2004-196299 | 7/2004 |
| JP | 2010-234907 | 10/2010 |
| JP | 2011-25859 | 2/2011 |
| KR | 10-2012-0042328 | 5/2012 |
| WO | 01/81149 | 11/2001 |
| WO | 2007/026114 | 3/2007 |
| WO | 2009/121386 | 10/2009 |
| WO | 2009/138578 | 11/2009 |
| WO | 2011/070950 | 6/2011 |
| WO | 2013/056765 | 4/2013 |
| WO | 2013/056766 | 4/2013 |
| WO | 2013/056771 | 4/2013 |

* cited by examiner

STEERING SHAFT BEARING UNIT FOR ROTATABLY MOUNTING A STEERING SHAFT

BACKGROUND OF THE INVENTION

The present invention relates to a steering shaft bearing unit for the rotatable bearing of a steering shaft of a steering column for a motor vehicle. The steering shaft bearing unit comprises at least one circumferentially closed region for receiving at least one bearing for the rotatable bearing of the steering shaft and at least one securement region for securing the steering shaft bearing unit on a bracket part of the steering column, and in the securement region at least one through-opening, in particular two through-openings, is or are disposed for guiding through a clamp bolt of the steering column.

The invention further relates also to a steering column with such a steering shaft bearing unit as well as a method for the production of the steering shaft bearing unit.

EP 1 535 824 B1, EP 1 547 902 A1, EP 1 553 002 B1, U.S. Pat. No. 7,350,813 B2 and JP 10-7003 disclose generic steering shaft bearing units, all of which have in common that the steering shaft bearing unit is widened in the securement region in order to provide suitable securement areas for securing in position the steering shaft bearing unit on a bracket part and therewith on a motor vehicle body. The widening of the jacket sheet metal in the securement region entails two significant disadvantages. For one, the widening leads to a thinning-out and therewith to a weakening of the jacket sheet metal in this region. For another, the process of widening the jacket sheet metal is tied to increased technical expenditures.

The invention therefore addresses the problem of providing a generic steering shaft bearing unit which can be produced as simply and as cost-effectively as feasible and yet meets high demands made of its rigidity.

SUMMARY OF THE INVENTION

The steering shaft bearing unit to be produced uses half-shell technology. This means to develop the unit from half shells, each of which comprises a section of the securement region and a section of the at least one circumferentially closed region. The joining can preferably be carried out by means of welding but also by means of other types of joining.

One fundamental concept of the invention is consequently joining a steering shaft bearing unit of several prefabricated structural parts, each of which is producible in simple and cost-effective manner. It becomes herein feasible to employ for the particular structural parts an optimized fabrication method, such as deep-drawing, extrusion molding, casting, etc. and utilize in each case materials optimized for the requirements. The steering shaft bearing unit is formed of at least two half shells which comprise within them sections of the circumferentially closed region for receiving the bearing of the steering shaft and sections of the securement region for securing in position the steering shaft bearing unit on the motor vehicle.

Through the initially separate fabrication of these half shells, it is possible to produce the half shells quickly and cost-effectively. The joining, in particular by welding, can also be carried out simply and cost-effectively. The steering shaft bearing unit can thereby be produced highly economically. With this approach it is moreover not problematic to meet the required demands made of rigidity. The individual half shells or their subhalf shells or component parts from which they are produced by joining can be formed, in case they are produced by means of sheet metal reforming, at low reforming degrees such that good strength and low wall thickness reduction can be achieved in the securement region also.

Preferably, the steering shaft bearing unit is structured of precisely two half shells. However, the production of the steering shaft bearing unit can also involve the joining of more than two half shells. The term half shell is herein maintained. However, it could also be replaced by the term sub-shell. Each half shell or subshell comprises in every case a section of the securement region and at least one section of at least one circumferentially closed region.

Especially preferred embodiments of the invention provide for the half shells or subshells to be joined together, preferably welded together, in a plane of symmetry that extends through a longitudinal axis of the steering shaft bearing unit.

The half shells or subshells can be deep-drawn sheet metal half shells. The longitudinal axis of the steering shaft bearing unit advantageously coincides with that axis about which the steering shaft can be bearing supported or is bearing supportable. This can be realized in different implementations.

Further separate structural parts, which, for example, are required for further functions, can be connected with the steering shaft bearing unit formed from the half shells or subshells.

In a preferred embodiment, the steering shaft bearing unit is developed as at least regionally circumferentially closed unit in the securement region. It is herein especially to be preferred to develop the steering shaft bearing unit entirely as a single-wall unit. This can be produced especially simply and advantageously using half shell technology.

Preferred embodiments of the invention provide for each steering shaft bearing unit to comprise at least two circumferentially closed regions to receive at least one bearing for the rotatable bearing of the steering shaft and for the securement region to be disposed between the circumferentially closed regions. Variants that are especially advantageously producible provide that they involve precisely two circumferentially closed regions for each of them to receive at least one bearing. The circumferentially closed region or regions of the steering shaft bearing unit for receiving at least one bearing can be developed tubularly. However, the steering shaft bearing unit can also comprise precisely only one circumferentially closed region for receiving at least one bearing for the rotatable bearing support of the steering shaft. In this case, a second bearing for the steering shaft can be disposed, for example, in a power assistance steering unit or in the bracket part of the steering column.

The securement section of the steering shaft bearing unit comprises with advantage at least two securement webs spaced apart from one another, each with an end region. In each end region of the securement webs, one of the through-openings is disposed and the end regions are connected with one another by means of a connection section, wherein there is preferably provided that the connection section has a V-shaped cross section.

The recurvature region of the V-shaped cross section of the connection section advantageously extends parallel to a longitudinal axis of the steering shaft. It is especially advantageous for this recurvature region or the tip of the V-shape of the separate connection sheet metal to extend longitudinally. It can extend with its longitudinal extent in a plane of symmetry of the securement region, in particular along a connection line along which the half shells or subshells are connected with one another.

A preferred method for the production of a steering shaft bearing unit according to the invention provides that in a first method step at least two, preferably precisely two, half shells or subshells are fabricated, each of which comprising at least one section of the securement region and at least one section of the region comprising at least one circumferentially closed region, and that, in a subsequent method step, these half shells or subshells are connected, preferably directly and preferably welded, with one another for the formation of the steering shaft bearing unit.

To increase the rigidity of the steering shaft bearing unit in particular in the region of the securement webs, in the steering shaft bearing unit at least one steering shaft bearing unit bead can be disposed. The, preferably each, through-opening can preferably in each case be disposed in a steering shaft bearing unit bead. Especially preferred embodiments of the invention provide in this context that the steering shaft bearing unit comprises precisely two steering shaft bearing unit beads and that in each steering shaft bearing unit bead is disposed one through-opening for guiding through a clamp bolt known per se. Each securement web advantageously comprises precisely one steering shaft bearing unit bead in each of which one through-opening is disposed. The steering shaft bearing unit beads are advantageously disposed in the proximity of end regions of the securement webs. The through-openings are preferably elongated holes. It is furthermore advantageous for the through-opening to be disposed in the bead base of the steering shaft bearing unit bead. It is especially advantageous for the through-opening to be disposed approximately symmetrically between the side walls or margins delimiting the bead base and extending approximately parallel.

The steering shaft bearing unit beads advantageously involve so-called inner beads. These are characterized thereby that the steering shaft bearing unit bead or beads is or are developed as bead or beads recessed in the direction into an internal volume of the securement region.

Preferred embodiments of the invention provide that the steering shaft bearing unit is developed in the securement region and/or in the circumferentially closed region for the reception of at least one bearing and/or at all sites as a single wall. This applies in particular to the securement region, however, preferably also to the circumferentially closed region for receiving at least one bearing for the rotatable bearing support of the steering shaft.

The steering shaft bearing unit is advantageously comprised of a metal, preferably of sheet metal. The metal is preferably steel, aluminum, magnesium or alloys comprising these metals. However, compound materials, for example compound carbon fiber materials, or cast parts or a mixture of said materials can also be employed.

Apart from the steering shaft bearing unit, the invention also relates to a steering column for a motor vehicle with a bracket part provided for securing the steering column in position on a motor vehicle body, which bracket part comprises at least two side jaws. A steering shaft bearing unit according to the invention is disposed with its securement region between the side jaws and retained on the side jaws by means of the securement webs.

The steering columns according to the invention advantageously involve so-called adjustable steering columns. As is known, these are characterized thereby that the position of the steering shaft including the steering shaft bearing unit is adjustable with respect to the bracket part. The position of the steering wheel can hereby be adapted to the particular driver of the motor vehicle. Especially preferred embodiments of steering columns according to the invention provide that the steering shaft is adjustable in its length direction and/or in a height direction orthogonal to the length direction.

Preferred implementations of such steering columns provide that, between at least two, preferably precisely two, side jaws of the bracket part provided for the securement of the steering column on a body of a motor vehicle, the steering shaft bearing unit is bearing supported for the rotatable bearing support of the steering shaft of the steering column. In preferred implementations between the side jaws of the bracket part and the steering shaft bearing unit is disposed a bearing part. A clamp bolt of the steering column can penetrate the side jaws of the bracket part and the bearing part and the steering shaft bearing unit. The bearing part can herein comprise at least one bearing part bead and the steering shaft bearing unit can comprise at least one steering shaft bearing unit bead, wherein the bearing part bead is at least regionally areally in contact on the steering shaft bearing unit bead. In such implementations is provided especially preferably for the clamp bolt to penetrate the bearing part in the bearing part bead and the steering shaft bearing unit in the steering shaft bearing unit bead.

The steering column according to the invention can advantageously be implemented such that it can be set in its height, which is identical to inclination, and/or in its length. Preferred are generally cost-effective height- and length-adjustable steering columns which comprise a securement device that makes possible the optional enabling (=open state of the securement device) or fixing (=closed state of the securement device) of the particular displacement direction. The clamp bolt, as a part of such a securement device, together with further clamping parts, such as for example a tightening member, a cam plate, a clamping nut, can herein serve in simple manner for the optional enabling or fixing of the feasible adjustment in length directions and/or height direction in known manner, depending on the realization. Independently of fixing under form closure or force closure (also friction closure), it is always advantageous for high pressing forces to be applied in the closed state of the securement device onto the connections between steering shaft bearing unit and bearing part, on the one hand, and bearing part and bracket part, on the other hand.

Through the penetration of the clamp bolt through steering shaft bearing unit bead and bearing part bead, the tightening forces exerted by the clamp bolt are directly transmitted to the two listed beads, such that using a simple construction high forces can be transmitted. This aids also in reducing the number of structural parts. In the open state, in which no or only minimal tightening forces are transmitted via the clamp bolt, high guide precision in the adjustment is also attained. The rigidity can herein be further increased if the bearing part and the steering shaft bearing unit on the surfaces oriented parallel to the two side jaws comprise on both sides of the steering shaft correspondingly one steering shaft bearing unit bead and one bearing part bead, which are penetrated by a clamp bolt. This also aids in reducing the number of structural parts and/or the material utilization for the production of the steering column. In the open state, in which no or only minimal tightening forces are transmitted via the clamp bolt, through the assembly according to the invention a low-play guide system is attained without large expenditures. To the driver of the motor vehicle, consequently, in this state also a stable and full sensation is conveyed when handling the steering wheel attached on the steering shaft of the steering column. The bearing part bead and the steering shaft bearing unit bead as well as a bracket part bead optionally also provided and discussed below, are advantageously developed such that they correspond to one another. It is in these terms also preferred if the bearing part bead is developed, viewed in a section plane through a longitudinal center axis of the clamp bolt, geometrically similar to the steering shaft bearing unit bead. The same applies advantageously also to a bracket part if such is provided. It is further also advantageous if the bearing part bead and/or the steering shaft bearing unit bead and/or the optionally provided bracket part bead is or are developed axisymmetrically with respect to a longitudinal center axis of the clamp bolt.

It is advantageous if the beads are each in contact, preferably in pairs, with their side walls on one another. However, in order to be able to transmit especially high tightening forces in the axial direction, preferred embodiments of the invention provide that the bearing part bead and the steering shaft bearing unit bead and, if provided, also the bracket part bead comprise each side walls and a bead base connecting the side walls. Especially advantageous is the development of side walls in the particular beads, which are inclined in the range of 30° to 60°, preferably 45° to 60°, with respect to the bead base. In the closed state of the securement device the bearing part bead and the steering shaft bearing unit bead are, preferably pairwise, under prestress in contact on one another with their side walls. The clamp bolt is advantageously guided through an opening in the particular bead base.

The development of the bead base in the bearing part bead as well as also in the steering shaft bearing unit bead oriented parallel, or at least nearly parallel, with respect to one another enables the compensation of tolerances, with the simultaneous increase of the contact tension in the contact between the side walls of the two beads. In this case, the two bead bases are not in contact with one another in the closed state of the securement device. However, alternatively, it is also conceivable and feasible with the restriction of the tolerance to provide this contact between the particular bead bases to be straight, wherein also a considerable pressing force increase onto the contact between the side walls is enabled.

As already addressed, embodiments of the invention provide that each of the side jaws of the bracket part comprises at least one bracket part bead and that the clamp bolt penetrates the side jaws in the bracket part bead and the bracket part bead, preferably on two opposite sides of the clamp bolt, is at least regionally areally in contact on the bearing part bead.

By guiding the clamp bolt through the bearing part bead, the steering shaft bearing unit bead and optionally also the bracket part bead, a highly compact construction method can be achieved. The clamp bolt can be disposed in close proximity on the steering shaft rotatably bearing supported in the steering shaft bearing unit. This leads to an equally compact as well as also stable construction method. In addition, the forces transmitted via the clamp bolt act very directly onto said beads.

It is advantageously provided that the bolt penetrates centrally the bearing part bead and the steering shaft bearing unit bead as well as the optionally provided bracket part bead which is further advantageous for a symmetric force introduction distributed onto all side walls of the particular beads. The bead base advantageously has a width such that the clamp bolt can be guided completely through an opening in the bead base. The bead base can still comprise further regions lateral to the openings, with which regions it is braced on the bead bases of the other beads. The openings or cutouts in the beads or bead bases through which the clamp bolt is guided should advantageously be greater than the diameter of the clamp bolt such that the clamp bolt is not in direct contact on the margins of the openings or cutouts. This has, for example, the advantage that in the event of a motor vehicle crash, no rotational movement of the clamp bolt is triggered. Moreover, the abrasion in the elongated holes is reduced.

For the sake of completeness, reference is made to the fact that the steering shaft bearing unit bead is a bead in the steering shaft bearing unit, the bearing part bead is accordingly a bead in the bearing part, and the bracket part bead, again, accordingly a bead in the bracket part. As is generally known, a bead is a channel-like indentation or grooving. Geometrically similar are two beads if they can be transformed one into the other through similarity mapping, e.g. a geometric mapping that can be combined from centric elongations and congruence mapping such as shifting, rotation or mirroring.

It is conceivable and feasible in terms of the invention to implement the beads as so-called inner beads or also as outer beads. The beads are preferably developed as so-called inner beads since in this case a simpler construction leads to a correspondingly stable steering column. Especially preferably by inner bead is to be understood in terms of the invention a bead whose base is recessed approximately perpendicularly to the plane of the side jaws in the direction toward the steering shaft, wherein the base extends substantially parallel to the plane of the side jaws. Hereby a compact construction method is attained. In addition, high forces can also be transmitted. It is consequently advantageous in these terms for the bearing part bead and the steering shaft bearing unit bead, and, if provided, also the bracket part bead are developed as recessed in the direction toward the region between the side jaws of the bracket part. In terms of an advantageous force transmission as effective as possible, preferred variants provide furthermore that the bearing part bead on two opposing sides of the clamp bolt is at least regionally areally, or alternatively at least regionally in the form of a line, in contact on the steering shaft bearing unit bead. In terms of low-play guidance and the capability of being able to absorb high forces even in the event of a crash, especially preferred embodiments of the invention provide that the bearing part bead and/or the steering shaft bearing unit bead and/or the optionally provided bracket part bead is or are implemented such that they extend in the longitudinal direction. Hereby an especially great guidance length, and therewith an ideal force bracing under torque loading, such as for example in the event of a crash, is provided.

Especially preferred embodiments of the invention provide that the bearing part is formed unitarily, for example of a curved, preferably curved in the shape of a U, strip of sheet metal. In terms of a stable bearing, the bearing part comprises at least two securement sites spaced apart from one another at which it can be secured directly or indirectly on the body of the motor vehicle. In these terms, a preferred embodiment of the invention provides that the bearing part comprises at least at one site, spaced apart from the clamp bolt, a bearing part securement forming a fixed or a swivel joint for securing the bearing part on the body of the motor vehicle or on the bracket part. The bearing part securement can herein be reinforced or rigidified. In terms of a low-play bearing that is as stable as possible, it is advantageous if the distance between clamp bolt and bearing part securement corresponds at least to half, preferably at least to three-fourths, of the length of the bearing part.

Preferred variants of the invention, as already stated, are implemented as so-called adjustable steering columns. It can be provided, for example, that the bearing part is swivellably bearing supported to provide height adjustability of the steering column. It can further be provided that the steering shaft bearing unit is displaceably bearing supported in the bearing part to provide length adjustability of the steering column in the longitudinal direction of the steering shaft. Especially preferred embodiments of steering columns according to the invention are height adjustable as well as also length adjustable. They consequently comprise a combination of the last listed features. For the sake of completeness, however, reference is made to the fact that the steering columns according to the invention can also be so-called rigid steering columns which do not have any of the listed adjustment capabilities.

It must also be taken into consideration that the features of the steering column described with respect to the beads can not only be employed in order to provide an adjustable steering column with as low a play as is possible. Rather, the penetration of said beads by the clamp bolt can also be utilized for the purpose of providing an energy absorption device for said rigid or also adjustable steering column thereby that the beads are implemented as crash beads which are known per se and which reform themselves in the event of a crash. Through the implementation of the beads, in the event of a crash a skidding-through via the bead guidance can be enabled for the energy absorption. In adjustable steering columns, in which said beads are additionally also implemented as crash beads, the regions of the beads relevant for the energy conversion in the event of a crash are advantageously located at the end of the displacement path for the steering column adjustment.

It is also conceivable and feasible to fabricate the steering shaft bearing unit of two or more structural parts, wherein the steering shaft bearing unit is formed by joining the structural parts along a longitudinal axis along which the steering shaft is rotatably bearing supported and wherein each of the structural parts is produced using a half shell technology as was described above. In particular, the steering shaft bearing unit can be formed by longitudinal sections which are developed according to the above described features and which are disposed oriented with respect to one another along a longitudinal axis about which the steering shaft is rotatably supportable. The longitudinal sections or subhalf-shells are connected with one another accordingly. The connection of the longitudinal sections or subhalf-shells can here also be carried out by welding.

At least one of the, preferably the, half shells or subshells, viewed in a longitudinal direction along a longitudinal axis of the steering shaft bearing unit can be structured in multiple parts by joining, preferably by welding together, at least two subhalf-shells.

BRIEF DESCRIPTION OF THE DRAWINGS

Further features and details of preferred embodiments of the invention will be explained in conjunction with the following description of the drawings, in which.

DETAILED DESCRIPTION OF THE INVENTION

Figure 1:
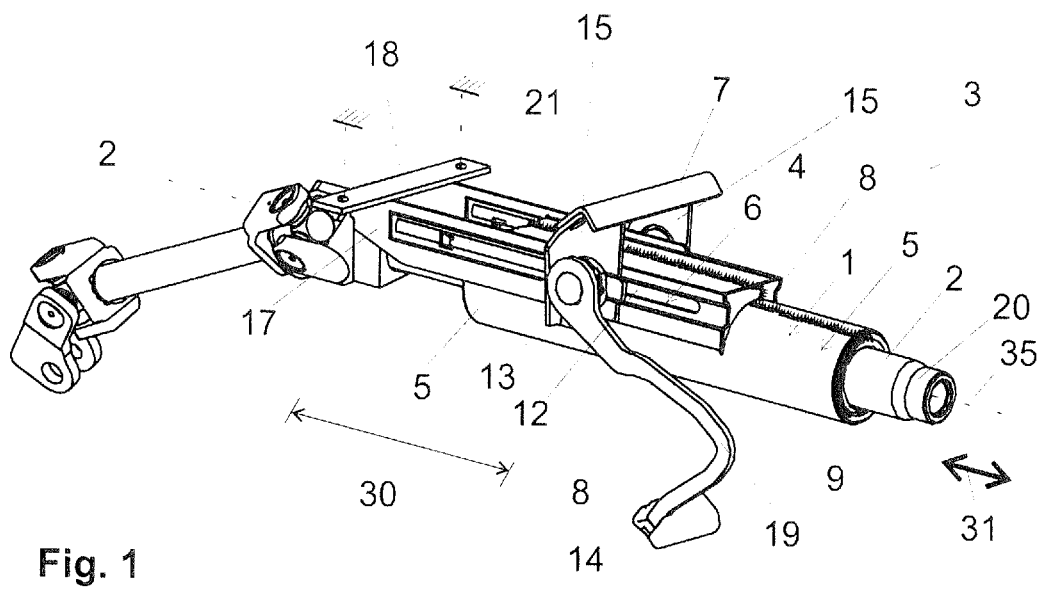
FIGS. 1 and 2 show a first embodiment according to the invention in the form of a length-adjustable steering column.
Figure 2:
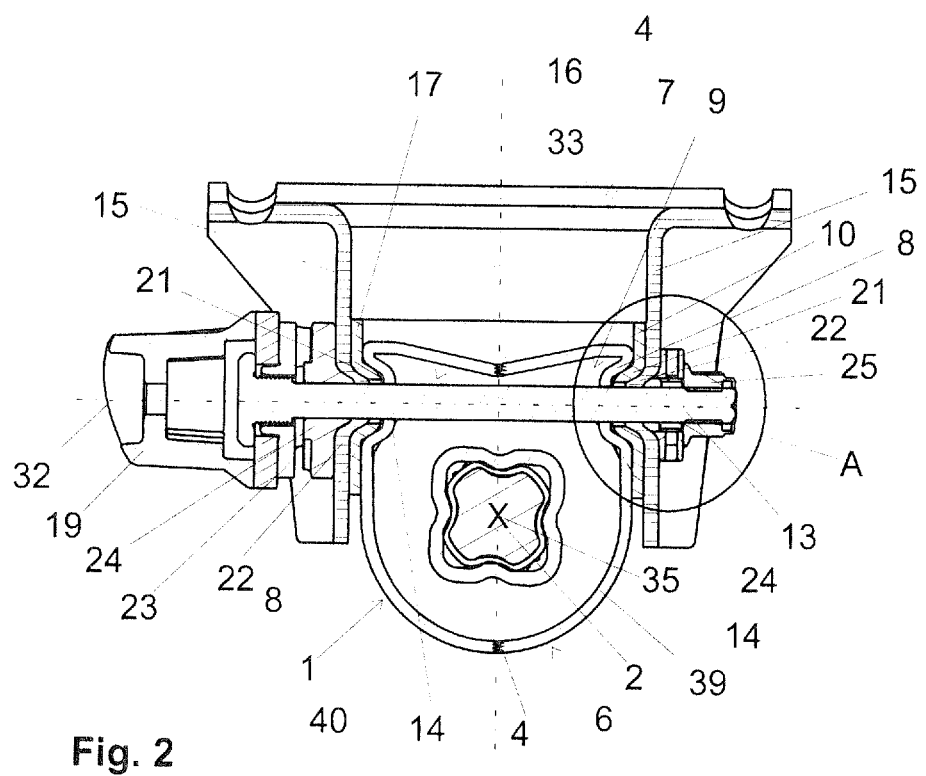

FIG. 1 depicts a first steering column 3 with a steering shaft bearing unit 1 according to the invention. By a bracket part 7, it can be secured on a body of a motor vehicle not shown here. FIG. 2 shows a vertical section through this steering column 3 along a clamp bolt 13. In particular, FIG. 2 shows especially clearly that the bracket part 7 comprises two side jaws 15 between which the steering shaft bearing unit 1 is retained. In the steering shaft bearing unit 1, the steering shaft 2 is supported such that it is rotatable about its longitudinal axis 35. The steering wheel adapter 20 of the steering shaft 2 is provided for the securement of a steering wheel, not shown here, on the steering shaft 2. Between the side jaws 15 and the steering shaft bearing unit 1 is located the bearing part 17. At the end, facing away from the clamp bolt 13, the bearing part 17 is securable by means of the bearing part securement 18 in the depicted embodiment on the body, not depicted here, of the motor vehicle. Implementations are also conceivable in which the bearing part securement 18 is secured on the bracket part 7. In the first embodiment the bearing part securement 18 is implemented rigidly in any case. The length of the bearing part 17 is provided with the reference number 30 in the drawing. As explained in the introduction, it is advantageous for the bearing part securement 18 to be as far removed from the clamp bolt 13 as is possible. As already explained, for this purpose the distance between clamp bolt 13 and bearing part securement 18 should be at least half, preferably at least three-fourths, of the length 30 of the bearing part 17. In the joint region 4 the two half shells or subshells 39, 40, from which the steering shaft bearing unit is formed, are connected with one another by, for example, laser welding. In the depicted embodiment the joint region 4 extends within the plane of symmetry 16 which extends approximately parallel to the securement webs 8 and which intersects the longitudinal axis 35 about which the steering shaft 2 is rotatably supported. It is conceivable and feasible to form the joint region 4 at another circumferential region of the steering shaft bearing unit 1. This can be expedient for being able to implement the two half shells or subshells 39, 40 more advantageously in terms of fabrication techniques.

The depicted embodiment according to FIGS. 1 and 2 involves a length-adjustable steering column 3. The displacement directions are denoted by the double arrow 31. This corresponds to the longitudinal directions of the steering shaft 2.

In order to enable, on the one hand, the displacement in the longitudinal directions 31, however, on the other hand, to ensure sufficiently strong securement during operation of the steering shaft bearing unit 1 on the bracket part 7, in the case of this steering column, as is known per se, a securement device is provided which, inter alia, encompasses the clamp bolt 13 and the actuation lever 19. It is understood that motor actuations of the securement device are also conceivable. In such cases the actuation lever 19 can be omitted. Securement devices with clamp bolts 13 for adjustable steering columns 3 are known within prior art in a multiplicity of implementations. The embodiments depicted here serve only as illustration of one of many different possible variants of the manner in which the clamping and release of the securement device can proceed.

In the depicted embodiment, a cam plate 23 is connected torque-proof with the actuation lever 19. The cams of this cam plate 23 cooperate with corresponding countercams of the tightening piece 24. The tightening piece 24 is connected torque-proof with the bracket part 7. On the opposite side the clamp bolt 13 is fixed with a clamping nut 25. Here is also located a tightening piece 24 or an axial bearing which is disposed between the clamping nut 25 and the corresponding side jaw 15 of the bracket part 7. By turning the actuation lever 19 about the center longitudinal axis 32 of the clamp bolt 13, the cam plate 23 is turned against the adjacently disposed tightening piece 24. Depending on the position of the involved cams with respect to one another, the securement device is subsequently in the closed state in which the steering shaft bearing unit 1 is fixed on the bracket part 7 at least under the forces occurring in normal operation. Through the appropriate rotation of the actuation lever 19 the securement device can subsequently be brought into the open state in which a displacement in the longitudinal directions 31 of the steering shaft bearing unit 1 relative to the bracket part 7, and therewith a setting of the position of the steering wheel, is enabled. Such securement devices are known per se and do not need to be further explained here.

As is especially clearly evident in the sectional representation according to FIG. 2, the bearing part 17 as well as also the steering shaft bearing unit 1 each have beads with which they are supported one in the other. In the first embodiment, the particular bearing part bead 21 is guided in one of the steering shaft bearing unit beads 14. In the depicted first embodiment according to FIGS. 1 and 2, the bracket part 7 additionally also comprises at both side jaws 15 one bracket part bead 22 which, in the depicted embodiment, engages into one of the bearing part beads 21. The clamp bolt 13 is guided through the bearing part beads 21 and the steering shaft bearing unit beads 14. In the depicted embodiment it is additionally also guided through the bracket part beads 22. It is conceivable and feasible, even in steering columns 3 which are only adjustable in length to omit a bracket part bead 22. The side jaws 15 are in that case preferably implemented planarly in the proximity of the tightening and displacement, at least in the surface directed toward the steering shaft bearing unit.

As can be seen especially well in FIG. 2, it is advantageous if, as in this embodiment also realized, the beads are implemented as so-called inner beads. This is the case if they are implemented such that they are recessed in the direction into the region 33 between the side jaws 15 of the bracket part 7 or in the direction into the interior volume of the securement region 6 forming the region 33.

Region A from FIG. 2 is once again depicted in FIG. 2 at an enlargement. It can here be seen especially well that each of the beads 14, 21 and 22 comprises two side jaws 28 which are each connected with one another by a bead base 29. The clamp bolt 13 penetrates in each instance the bead base 29 of said beads 14, 21 and 22. The cutout or opening necessary for this purpose is advantageously only large enough for there still lateral margins to be of the bead base 29. This enables greater rigidity in the contact of the bearing part bead 21 on the particular steering shaft bearing unit bead 14 since thereby, in the direction of the center longitudinal axis 32 of the clamp bolt 13, forces can be transmitted especially well. The side walls 28, and here also the bead bases 29 of the beads 14, 21 and 22 located adjacently, are fully in areal contact on one another. They are symmetric with respect to the center longitudinal axis 32 of clamp bolt 13 and, in terms of optimal contact on one another, have a geometrically similar form. In the first embodiment according to FIGS. 1 and 2, the tightening pieces 24, engaging from the outside into the bracket part beads 22, comprise projections formed out corresponding to the bead indentation, with which they engage into the bracket part beads 22. By guiding the clamp bolt 13 directly through the beads 14, 21 and here also 22, the clamping forces of the clamp bolt 13 act directly onto the beads whereby a simple as well as also effective construction method and force transmission is realized.

The through-opening 12, or the elongated hole forming it, is advantageously wider in the steering shaft bearing unit 1 than the diameter of hole 36 in the bearing part 17. The diameter of hole 37 in the bracket part 7 is advantageously smaller than the diameter of hole 36 in the bearing part 17. In this way the abrasion can be reduced. It is also conceivable and feasible for the production of a greater displacement length to implement the hole 36 as an elongated hole. In that case, instead of the diameter of hole 36, the width of the elongated hole, would have to be assessed as the measure of the above comparisons.

In general, reference should be made to the fact that through the construction according to the invention, a highly compact construction method is made possible thereby that the spacing between the clamp bolt 13 and the steering shaft 2 can be kept very low. This is preferably made possible through a single-wall implementation in which the steering shaft bearing unit 1 is formed by only a single circumferential wall, apart from potentially possible attachment parts, which may be attached for additional functions. In this way, between the clamp bolt 13 and the steering shaft 2 no walls are located with corresponding wall thicknesses and require increased minimum spacing between steering shaft 2 and clamp bolt 13. The steering shaft bearing unit 1 according to the invention and the fabrication technology in half shell technology enable this construction method in simple manner.

In the first embodiment, each steering shaft bearing unit bead 14 comprises as the through-openings 12 an elongated hole through which the clamp bolt 13 is guided. Through these elongated holes extending longitudinally in the longitudinal direction 31 of the steering shaft 2, it becomes feasible to displace the steering shaft bearing unit 1 in the longitudinal directions 31 relative to the bracket part 7.

The bearing part beads 21 and the bracket part beads 22 do not need to be implemented such that they extend longitudinally. Through the longitudinal extent of the bearing part 17 over its length 30 and the disposition of the bearing part securement 18, remote from the clamp bolt 13 in the longitudinal direction 31, a highly torsion-resistant and low-play bearing of the steering shaft bearing unit 1 is attained. Yet the torsion resistance of the construction can be still further increased thereby that, as realized in the first embodiment, the bearing part beads 21 also are longitudinally extended. The engagement of the bearing part beads 21 into the steering shaft bearing unit beads 14 is thereby, as realized in the first embodiment, markedly extended in the longitudinal direction 31 which further increases the torsion resistance of the overall construction.

Figure 3:
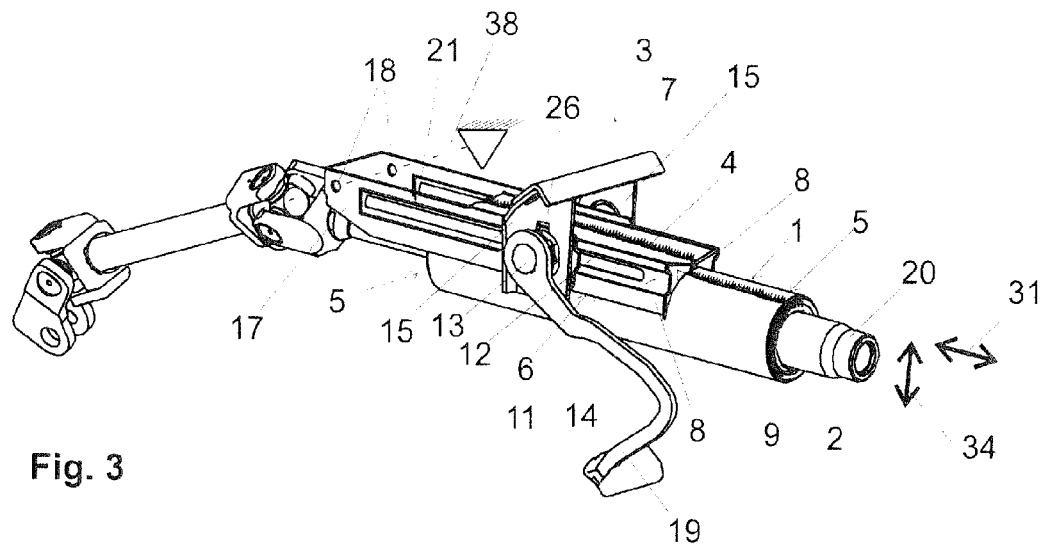
FIGS. 3 and 4 show a second steering column implemented according to the invention which is height- and length-adjustable.
Figure 4:
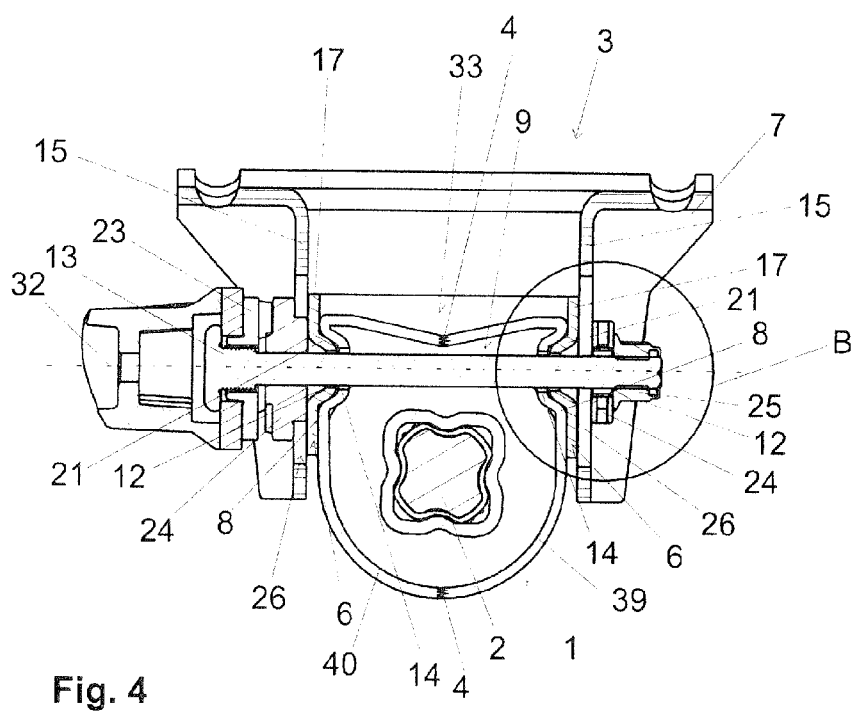

Before discussing the embodiment according to FIGS. 3 and 4, reference should be made to the fact that in all of the embodiments shown the particular bead configurations are realized bilaterally, thus on both side jaws 15 of the bracket part 7. This is advantageous in terms of a low-play rigid structure. However, it is not absolutely necessary. It would also be conceivable to realize the corresponding bead configurations in the region of only one of the side jaws 15.

In the embodiment according to FIGS. 3 and 4, in addition to the length adjustability of the steering column 3 in the longitudinal direction 31, a height adjustability of this steering column 3 or its steering shaft 2 in the height directions 34 is provided. For this purpose, in each of the two side jaws 15 of the bracket part 7 in this embodiment, a vertically extending elongated hole 26 is disposed in which the clamp bolt 13 is disposed such that it is longitudinally displaceable. Height as well as also length adjustment, however, are only possible when the securement device is in its open state. In the closed state of the securement device, these adjustment capabilities are not given at least not under the forces occurring during normal operation.

Figure 6:
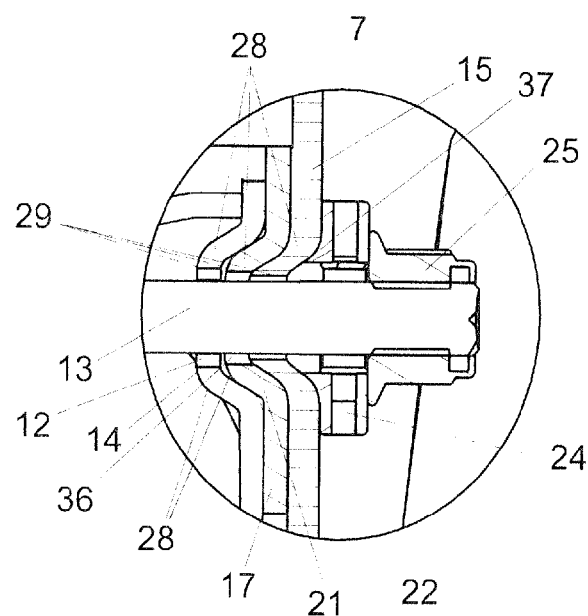
FIG. 6 shows the region A from FIG. 2.
Figure 7:
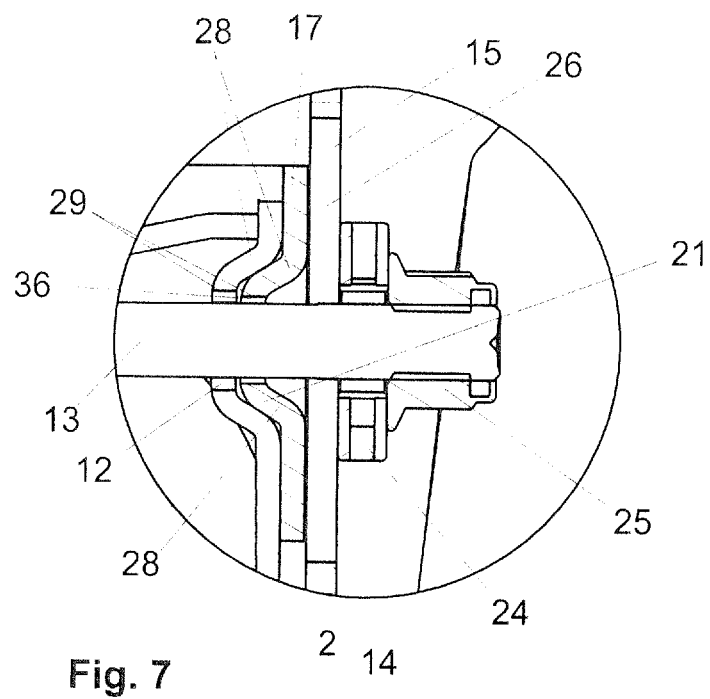
FIG. 7 shows the region B from FIG. 4.

In order to be able to realize the height adjustability in the height directions 34 also, in the embodiment according to FIGS. 3 and 4, the bearing part securement 18 of bearing part 17 comprises a swivel joint. The bearing part 17, together with the steering shaft bearing unit 1, can be swivelled about this swivel joint of the bearing part securement 18 about a swivel axis 38 when a height adjustment is carried out. A further difference from the first embodiment comprises that in this variant a bracket part bead is omitted on both side jaws 15. The elongated holes 26 are provided in the side jaws 15 on both sides. The tightening pieces 24 in this embodiment also do not comprise noses with which they would engage into the beads. It is nevertheless provided that the bearing part beads 21 are in contact in the steering shaft bearing unit beads 14 and that the clamp bolt 13 penetrates through these beads. All of this is once again shown in FIG. 7 at an enlargement by depicting in this Figure the detail B from FIG. 4. As far as applicable, the description provided in conjunction with FIG. 6 applies to this Figure also with the exception of the differences already stated.

Apart from these differences, the embodiment according to FIGS. 3 and 4 is substantially implemented like the first embodiment such that additional explanations in this regard are not necessary.

Figure 5:
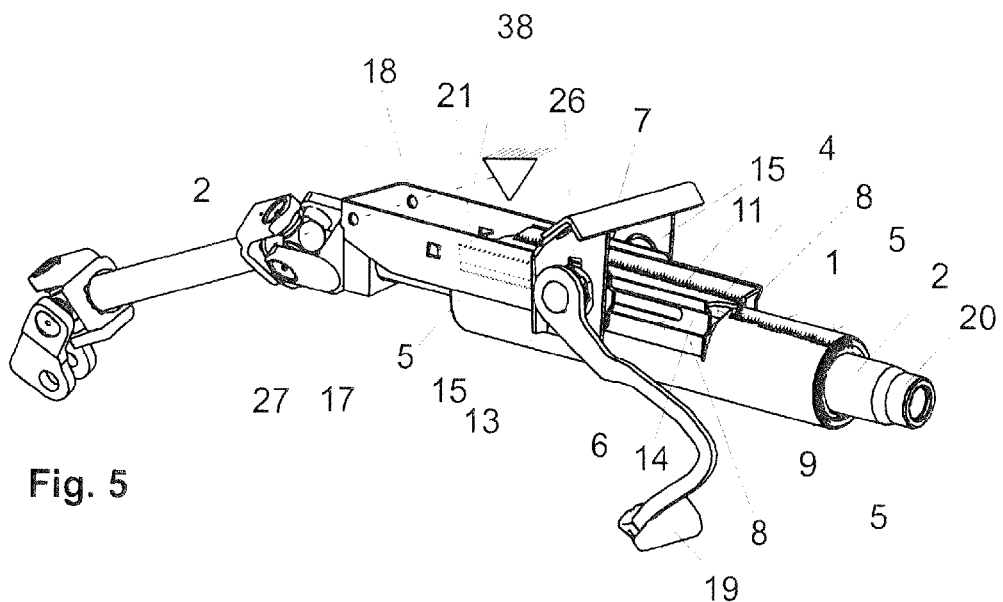
FIG. 5 shows a modification of the second embodiment according to the invention.

In general, reference is to be made to the fact that the steering shaft 2 is preferably rotatably bearing supported at two sites, spaced apart from each other, of the steering shaft bearing unit 1, by bearings, located here in circumferentially closed regions 5 of the steering shaft bearing unit 1. Although the bearings are not explicitly drawn here, they are known per se. In the modified variant of the embodiment according to FIGS. 3 and 4 depicted in FIG. 5, a steering shaft bearing 27 is provided at the motor-side end of the bearing part 17. In all other regards, this embodiment according to FIG. 5 corresponds to the variant according to FIGS. 3 and 4. It is also conceivable and feasible to secure this additional steering shaft bearing 27 directly on the motor vehicle body, not shown here, or to integrate it into a gearing, not shown here, for a power assistance of the steering movement. It is in particular for these cases conceivable and feasible to rotatably support the steering shaft at one single bearing in the steering shaft bearing unit 1.

Figure 9:
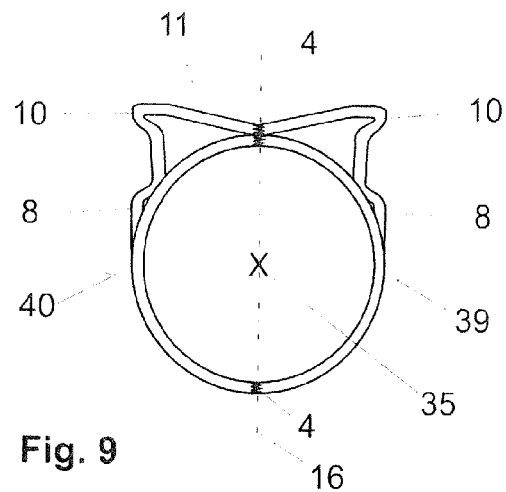
FIG. 9 shows depictions of a steering shaft bearing unit according to the invention in a front view.
Figure 10:
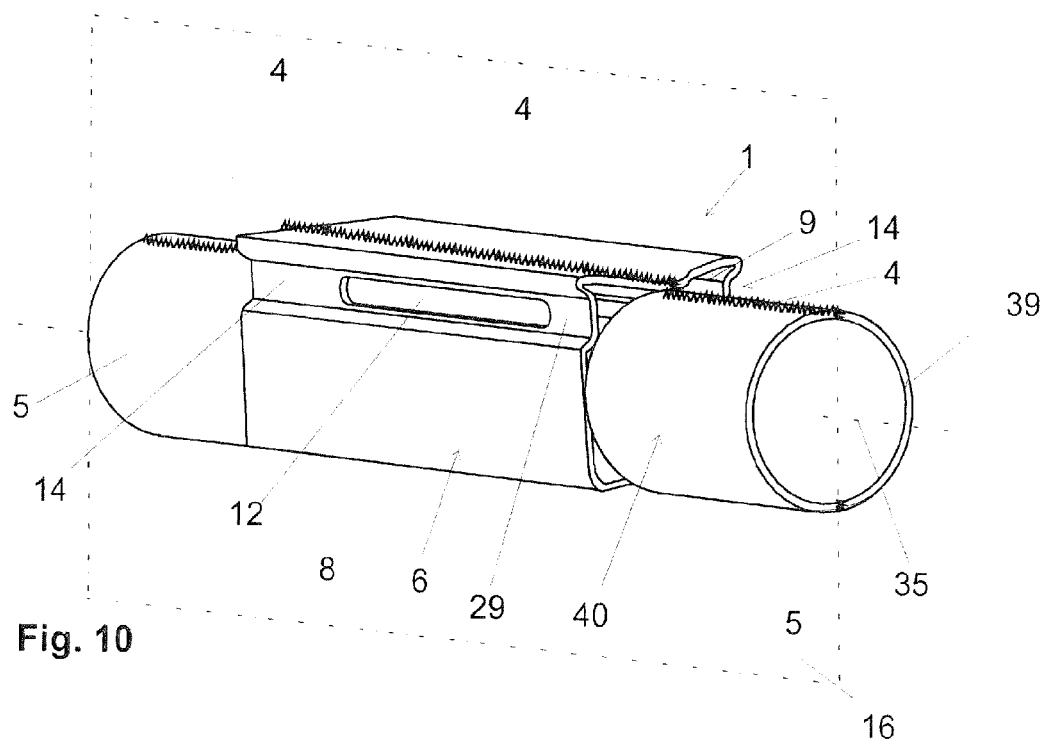
FIG. 10 shows depictions of a steering shaft according to the invention.

FIGS. 9 and 10 show separately, thus detached from the remaining steering column 3, the steering shaft bearing unit 1 according to the invention such as can be installed in the embodiments of steering column 3 according to FIGS. 1 to 5, however also in other variants according to the invention. The steering shaft bearing unit is formed in the example by two mirror-symmetric half shells or subshells 39, 40 which are connected with one another along the joint region 4.

As already explained, it is a fundamental concept of the invention to fabricate initially the individual half shells or subshells 39, 40 of the steering shaft bearing unit separately and subsequently to connect them with one another. It is hereby very simple to provide an especially stable and torque-proof steering shaft bearing unit 1.

Figure 8:
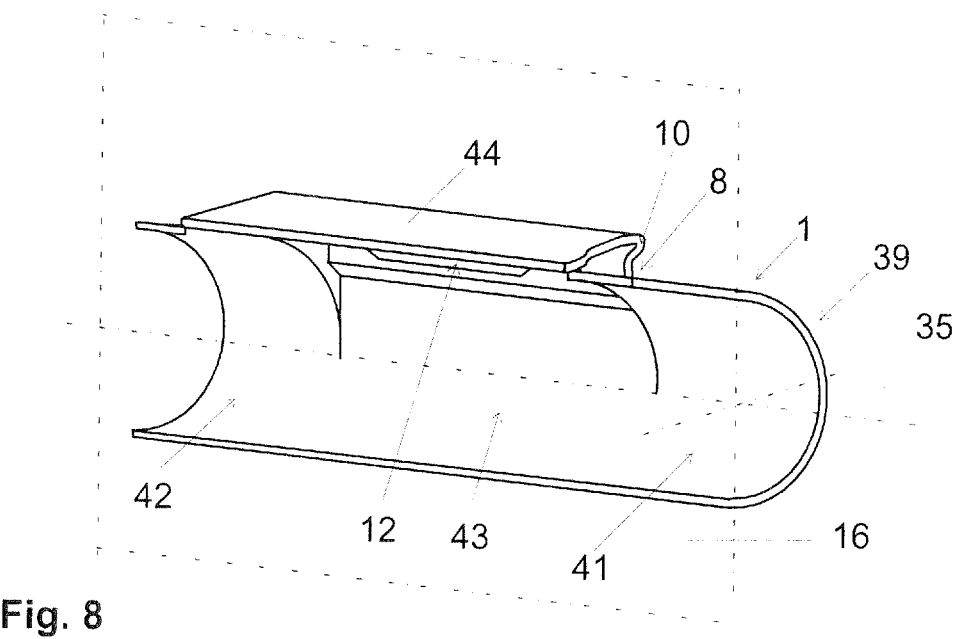
FIG. 8 shows an example of the manner in which a half shell or subshell can be implemented unitarily.

In FIG. 8 is depicted a half shell or subshell 39 which comprises a section 41 of a first circumferentially closed region 5 and a section 42 of a second circumferentially closed region 5 as well as a section 43 of a securement region 6. In section 43 of the securement region 6 a securement web 8 is developed. In the end region 10 of the securement web 8 a through-opening 12 is located, which here—as is preferred—is implemented as an elongated hole. The end region 10 is adjoined by a section 44 of the connection section 11, which section 44 is already comprised, in the form of a leg of the V-shape of the connection section 11 of steering shaft bearing unit 1. However, it is also conceivable and feasible to implement the connection section in the form of a W. The faces forming the V or the W can herein also be implemented in the form of an arc.

To facilitate the connection between the half shells or subshells 39, 40, additional shaped elements can be provided with which the structural parts can be positioned in orientation to each other before they are joined. Along these shaped elements the structural parts can be prepositioned in a type of play fitting or a minimal press fitting. In the following method step the structural parts are subsequently connected with one another for example by welding, preferably by laser welding.

In terms of an implementation as cost-effective as possible, it is preferably provided that, as also realized in the depicted embodiment according to FIGS. 8 to 10, the steering shaft bearing unit 1 is implemented at all sites entirely as a single wall.

To weld the individual structural parts 5 and 6 together, classic welding methods can be utilized, just as in the corresponding shaping can be utilized the orbital friction welding or the laser welding. It is, in particular, especially simply possible using half shell technology to implement the circumferentially closed region 5 such that the bearing for bearing supporting the steering shaft 2 can be directly pressed in for producing the steering column 1.

Figure 11:
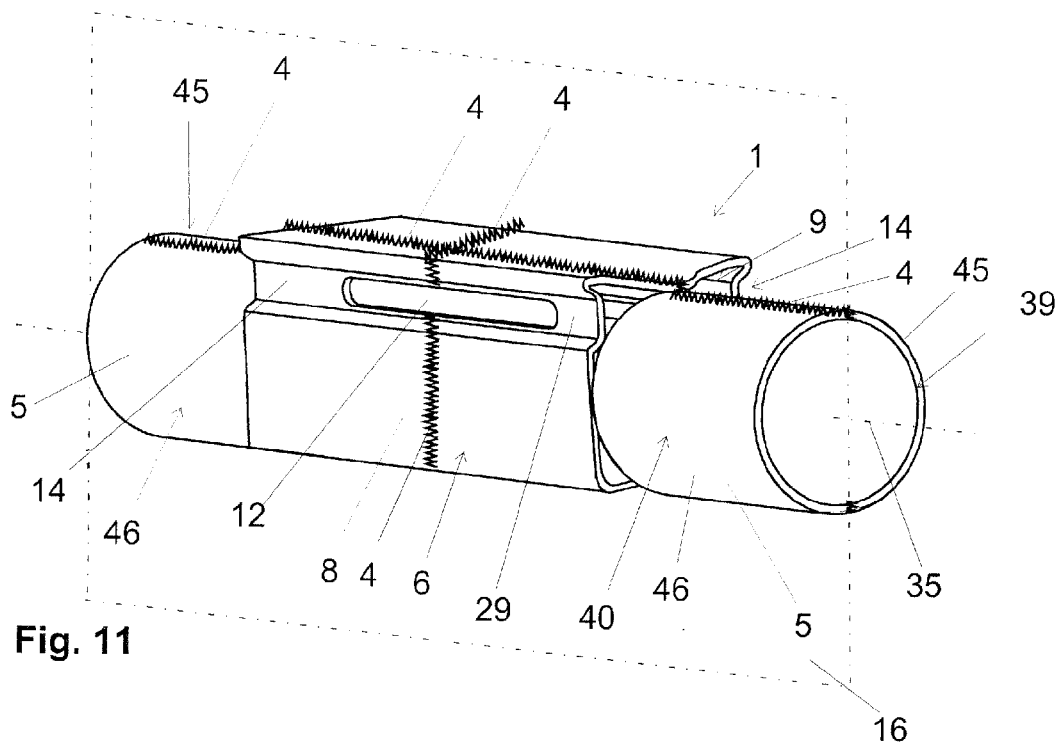
FIG. 11 shows a depiction of a further embodiment of the steering shaft bearing unit according to the invention in isometric view.

In FIG. 11 a further embodiment of the steering shaft bearing unit is illustrated. The steering shaft bearing unit 1 is here produced from two half shells or subshells 39, 40. The steering shaft bearing unit 1 is formed by joining the half shells or subshells 39, 40 along the longitudinal axis 35 of the steering shaft bearing unit 1, along which the steering shaft 2 is rotatably supportable. Each of the half shells or subshells 39, 40 is fabricated in the explained half shell technology from the subhalf shells 45 and 46. The half shells or subshells 39, 40 are oriented along the longitudinal axis 35 and connected in the joint regions 4 with one another. The connection of the half shells or subshells 39, 40 can here also be completed by welding. However, the sequence of the joining operations is in principle insignificant. It is conceivable and feasible to connect first the subhalf shells 45, 46 to form half shells or subshells 39, 40. However, alternatively, it is also feasible to connect first the subhalf shells 45 and 45 or the subhalf shells 46 and 46, which are disposed each on one side of the plane of symmetry, and subsequently to connect the two structural parts thus formed as half shells or subshells 39, 40 with one another.

When in the preceding description, sheet metal has been listed as the material, it should be noted that the structural parts or the intermediate forms can be fabricated for example of sheet steel, sheet aluminum, sheet magnesium and also of carbon fiber compound materials or other compound materials. Instead of sheet metal, cast parts can be utilized as preshapes or prefabricated parts. It is also conceivable and feasible to utilize a mixture of different materials and different production methods for the preshaped parts for producing the steering shaft bearing unit. The term sheet metal is thus to be interpreted correspondingly broadly in terms of a wall or a jacket and is not to be restricted to metallic or pure sheet metal.

Figure 12:
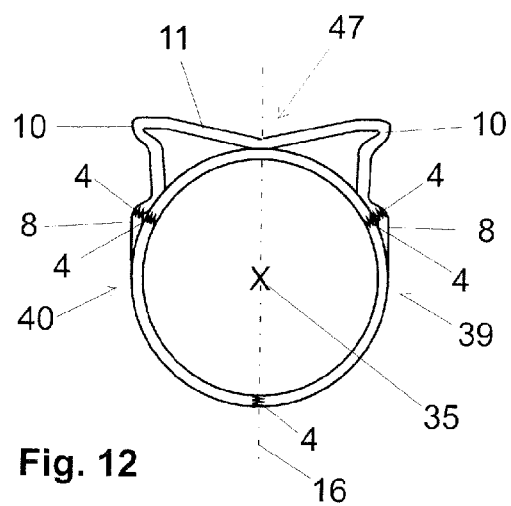
FIGS. 12 and 13 show an embodiment with three half shells or subshells.
Figure 13:
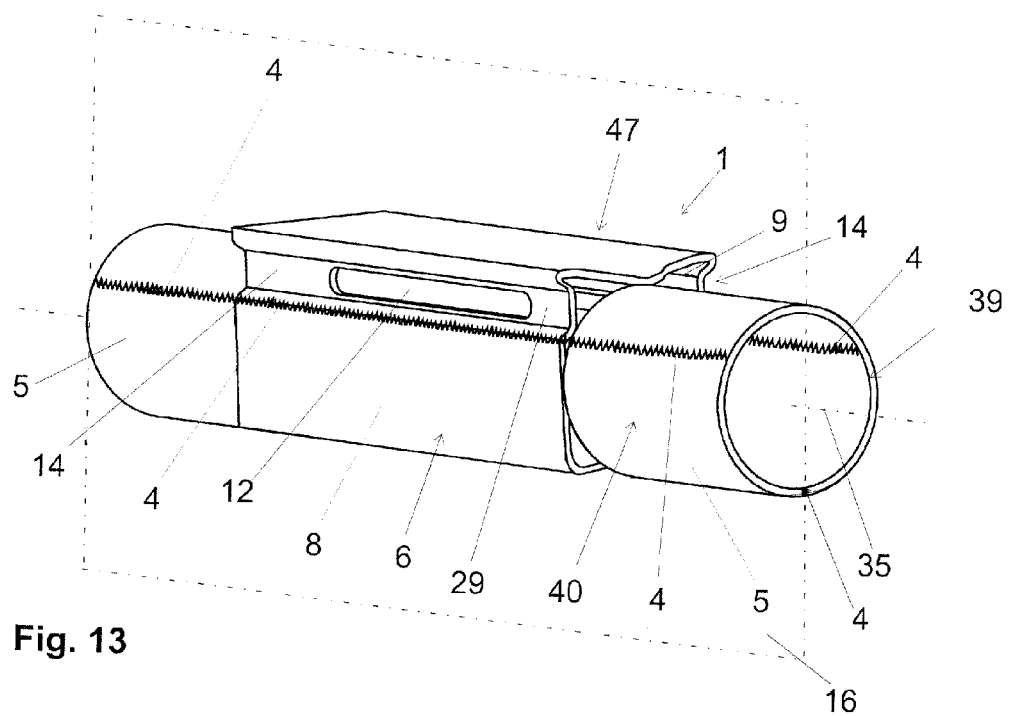

In the embodiment according to FIGS. 12 and 13, an embodiment with a steering shaft bearing unit 1 is depicted which is structured of overall three half shells or subshells 39, 40 and 47. These three half shells or subshells 39, 40 and 47 are also joined together in this embodiment by welding and each comprises at least one section of the securement region 6 and at least one section of the at least one circumferentially closed region 5. This embodiment also serves the purpose of once again clarifying that the term "half shell" does not mean that precisely two half shells or subshells 39, 40, 47 must be involved. The term "half shell" also does not absolutely define that the half shells or subshells 39, 40, 47 must be of equal size or axisymmetric or mirror symmetric. The half shells or subshells 39, 40 and 47 can be of different sizes and nonsymmetric with respect to one another. Their number is not limited to two.

If applicable, all features depicted in the individual embodiments can be freely combined with one another without leaving the scope of the invention.

LEGEND TO THE REFERENCE NUMBERS

1 Steering shaft bearing unit
2 Steering shaft
3 Steering column
4 Joint region
5 Circumferentially closed region 35
6 Securement region
7 Bracket part
8 Securement web
9 Opening
10 End region
11 Connection section
12 Through opening
13 Clamp bolt
14 Steering shaft bearing unit bead
15 Side jaw
16 Plane of symmetry
17 Bearing part
18 Bearing part securement
19 Actuation lever
20 Steering wheel adapter
21 Bearing part bead
22 Bracket part bead*
23 Cam plate
24 Tightening piece
25 Clamping nut
26 Elongated hole
27 Steering shaft bearing
28 Side wall
29 Bead base
30 Length
31 Longitudinal/length directions
32 Center longitudinal axis
33 Region
34 Height directions
35 Longitudinal axis
36 Hole
37 Hole
38 Swivel axis
39 Half shell
40 Half shell
41 Section
42 Section
43 Section
44 Section
45 Subhalf shell
46 Subhalf shell
47 Half shell

The invention claimed is:

1. A steering shaft bearing unit for rotatably supporting a steering shaft of a steering column for a motor vehicle, comprising:
at least two circumferentially closed regions for receiving at least one bearing for rotatably supporting the steering shaft; and
a securement region for securing said steering shaft bearing unit on a bracket part of the steering column, said securement region being located between said at least two circumferentially closed regions;
wherein said securement region has a through-opening for guiding a clamp bolt of the steering column therethrough; and
wherein at least a first section of said securement region and at least a first section of each of said at least two circumferentially closed regions are formed of a first half shell, and at least a second section of said securement region and at least a second section of each of said at least two circumferentially closed regions are formed of a second half shell, said first half shell being joined to said second half shell.

2. The steering shaft bearing unit as in claim 1, wherein said first half shell and said second half shell are joined along a plane of symmetry extending through a longitudinal axis of said steering shaft bearing unit.

3. The steering shaft bearing unit as in claim 2, wherein said first half shell and said second half shell are welded together along the plane of symmetry extending through the longitudinal axis of said steering shaft bearing unit.

4. The steering shaft bearing unit as in claim 1, further comprising separate structural parts connected to said joined first half shell and second half shell.

5. The steering shaft bearing unit as in claim 1, wherein at least a portion of said securement region is circumferentially closed.

6. The steering shaft bearing unit as in claim 1, wherein at least one of said securement region and said at least two circumferentially closed regions is formed of a single wall.

7. The steering shaft bearing unit as in claim 1, wherein said securement region comprises at least two securement webs spaced apart from one another, each of said at least two securement webs having an end region, said through-opening being located in said end region of each of said securement webs, and said end region of said securement webs being connected with one another by a connection section.

8. A steering column for a motor vehicle comprising:
a bracket part for securing said steering column on a body of the motor vehicle, said bracket part comprising at least two side jaws; and
said steering shaft bearing unit as in claim 7 arranged such that said securement region is between said at least two side jaws and retained on said at least two side jaws by said securement webs.

9. The steering shaft bearing unit as in claim 1, wherein at least one of said first half shell and said second half shell is structured of multiple parts by joining at least two sub-half shells in a longitudinal direction along a longitudinal axis of said steering shaft bearing unit.

10. The steering shaft bearing unit as in claim 9, wherein said first half shell and said second half shell are structured of said at least two sub-half shells welded together in the longitudinal direction along the longitudinal axis of said steering shaft bearing unit.

11. A method of producing said steering shaft bearing unit as in claim 1, comprising:

fabricating said first half shell and said second half shell, each of said first half shell and said second half shell comprising at least a section of said securement region and at least a section of said at least two circumferentially closed regions; and subsequently connecting said first half shell and said second half shell to form said steering shaft bearing unit.

12. The method of claim 11, wherein said fabricating comprises forming each of said first half shell and said second half shell as mirror images.

13. The method of claim 11, wherein said fabricating said first half shell and said second half shell comprises fabricating precisely two half shells, and said subsequently connecting comprises directly welded together said first half shell and said second half shell to form said steering shaft bearing unit.

14. The steering shaft bearing unit as in claim 1, wherein said though-opening is one of two through-openings in said securement region for guiding the clamp bolt of the steering column, said steering shaft bearing unit is structured of precisely two half shells welded together, each of said first half shell and said second half shell comprises at least one section of said securement region and at least one section of said at least two circumferentially closed regions.

15. The steering shaft bearing unit as in claim 1, wherein a connection section of said securement region has a V-shaped cross section.

16. A steering shaft bearing unit for rotatably supporting a steering shaft of a steering column for a motor vehicle, comprising:

a circumferentially closed region for receiving at least one bearing for rotatably supporting the steering shaft; and a securement region for securing said steering shaft bearing unit on a bracket part of the steering column;

wherein said securement region has a through-opening for guiding a clamp bolt of the steering column therethrough;

wherein at least a first section of said securement region and at least a first section of said circumferentially closed region are formed of a first half shell, and at least a second section of said securement region and at least a second section of said circumferentially closed region are formed of a second half shell, said first half shell being joined to said second half shell; and wherein said securement region comprises at least two securement webs spaced apart from one another, each of said at least two securement webs having an end region, said through-opening being located in said end region of each of said securement webs, and said end region of said securement webs being connected with one another by a connection section.

17. A steering column for a motor vehicle comprising:

a bracket part for securing said steering column on a body of the motor vehicle, said bracket part comprising at least two side jaws; and said steering shaft bearing unit as in claim 16 arranged such that said securement region is between said at least two side jaws and retained on said at least two side jaws by said securement webs.

* * * * *